INVENTORS
J. WEISE,
W. HAHN,
K. KRÖMER &
R. NOACK
ATTORNEYS

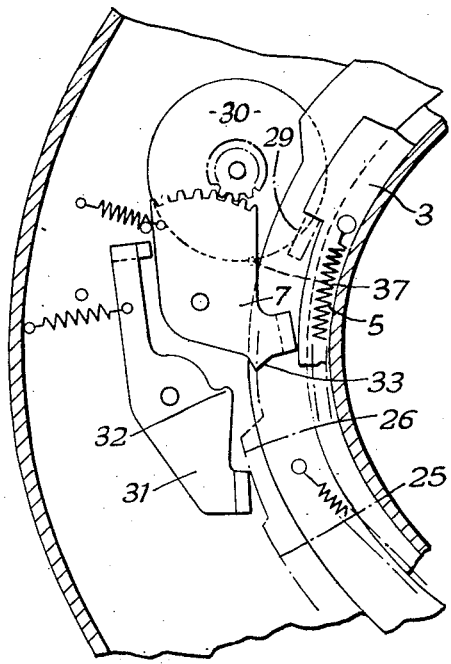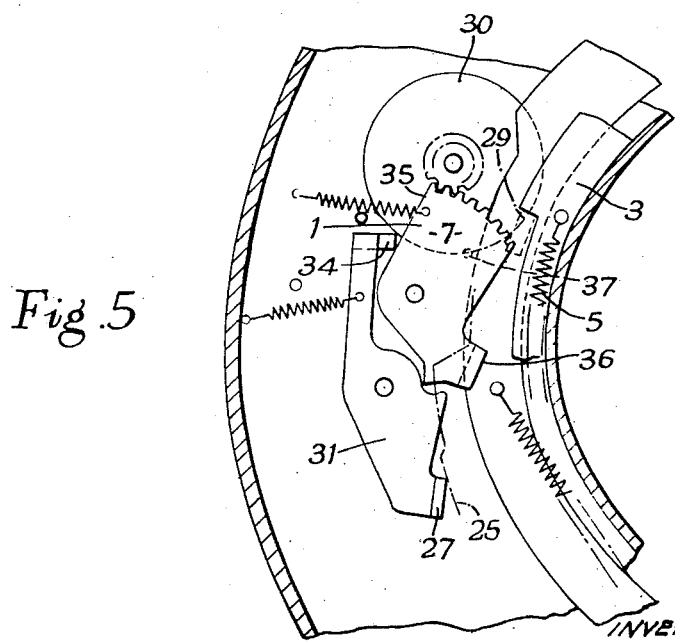

United States Patent Office 2,815,702
Patented Dec. 10, 1957

2,815,702

PHOTOGRAPHIC SHUTTERS

Johannes Weise and Werner Hahn, Dresden, Karl Krömer, Radebeul, and Rolf Noack, Dresden, Germany; assignors to Veb Zeiss Ikon, Dresden, Germany, a corporation of Germany Application November 29, 1955, Serial No. 549,639

9 Claims. (Cl. 95—63)

The present invention relates to a photographic objective shutter with a plurality of blades mounted on a blade driving ring, which on movement in one direction effect the opening and closing of the shutter and are provided, for the purpose of taking pictures with exposure times of different lengths, with a control arrangement and a blade driving mechanism, the force-storing means of which, in the form of a drive spring, delivers its stored energy directly to the blade driving ring.

It is the object of the invention to provide a control arrangement for the obtaining of both long and very short exposure times.

It is known to achieve long exposure times in the case of shutters with double-acting blades due to the fact that a retarding member delayed by an escapement projects into the path of the blade driving ring and retards its running-down movement. Since this retarding must take place, however, while the shutter aperture is completely clear, it is necessary to impart such a shape to the blades as to permit of opening the shutter completely despite the further movement of the blades taking place during the retarding of the blade driving ring. This shape of the blades which is produced due to the fact that the blades may not extend into the shutter aperture, necessitates an increase of the total angle of rotation of the blades and thus a corresponding increase in the travel of the blade driving ring. This fact is of especial advantage in the design of the gear connection of blade driving ring and blades, which is preferably effected by means of a so-called pin-slot connection, since gear-wheel connections are expensive and thus uneconomical. Furthermore, the above-mentioned shape of the blades is advantageous in the obtaining of very short times.

The present invention avoids these disadvantages in that two members preferably formed as rings, and provided with their own force-storing means, are provided, one of which controls the other member which is formed as the blade driving ring. As a result of one particular feature of the invention the control of the blade driving ring is effected by pawls disposed in the path thereof which are actuated successively by the running-down control member, the pawl first actuated holding the blade driving ring in the cocked position and the other pawl interrupting the movement of the driving ring at the moment when the blades completely open the shutter aperture. In order to obtain different times of opening of the shutter the control ring is preferably only delayed by a retarding member after the actuation of the first pawl and before the actuation of the second pawl.

As a result of a further feature of the invention in the case of relatively very short times, the pawl which retains the blade driving ring in a position corresponding to the open position of the blades may be pivoted out of the path of the driving ring. Due to this measure, more expediently effected by a time setting member, the blade driving ring is not first retained in its open position, but the closing movement can follow its opening movement immediately.

Furthermore, it is a feature of the invention to have the force-storing means of the blade driving ring and the cocking or control ring act in the same direction of rotation, thus it is possible without complicated arrangements, for example, rotation reversers, to be able to effect the simultaneous cocking of both members.

A further detail of the invention may be seen from the following description of an example of a form of embodiment of a shutter.

Figure 4 shows the shutter in its cocked position, a short time of exposure having been set; and Figure 5 shows the shutter in its cocked position, the shortest time of exposure having been set.

Figure 1:
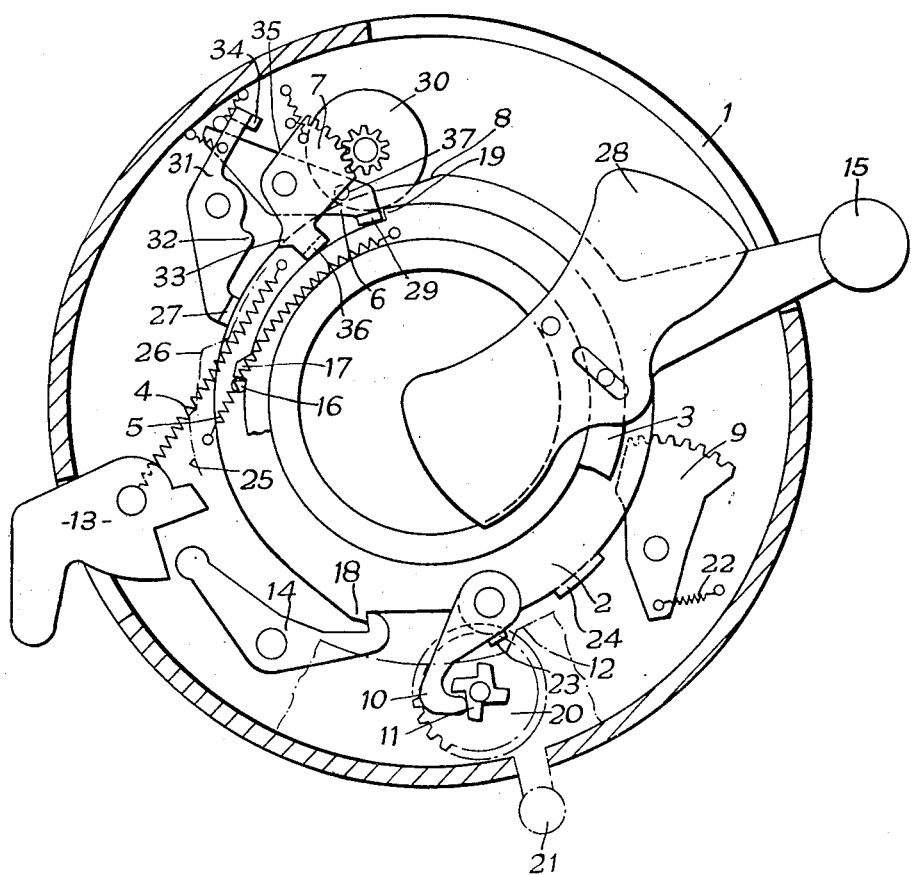
Figure 1 shows a shutter in the cocked position.

In the housing 1 there are mounted a control ring 2, serving at the same time as cocking ring, and a blade driving ring 3. Both rings are provided with springs 4 and 5. Shutter blades 28 are pivotally mounted on a fixed part of the housing and are drivable by means of pins mounted on the blade driving ring. In the path of the blade-drive ring 3 there are two pawls 6 and 7 which are spring-loaded and thus press against the blade drive ring 3. The control cam 8 of the control ring 2 (Figure 1) on running down, can pivot the pawls 6 and 7 successively out of the path of the blade drive ring 3. In order to increase the duration between the actuation of the first pawl 6 and that of the second pawl 7, a retarding member 9 delayed by an escapement (not shown) extends into the path of the control ring 2. Furthermore, on the control ring 2 a hook 10 is provided which can co-operate with a drive wheel 20, provided with the self-portraiture hook wheel 11 of the pre-timer mechanism (not shown). The cam 12 arranged on the setting member 21 permits, before the taking of a picture, the positioning of the hook 10 in or out of engagement with the hook wheel 11 according to choice. A locking lever 14 actuated by a release lever 13, is provided to arrest the shutter in the cocked position.

On rotation of the control ring 2 for cocking, a pin 16, carried by the control ring, engages behind the nose 17 provided on the blade drive ring 3 and drives it into the cocked position. When this has been reached the locking lever 14 falls behind the further nose 18 of the control ring 2 and the pawl 6 falls with its bent-over lugs 29 behind the projection 19 of the blade driving ring 3. Under the action of a spring 22 the retarding member 9 comes into the path of the control ring 2.

Figure 2:
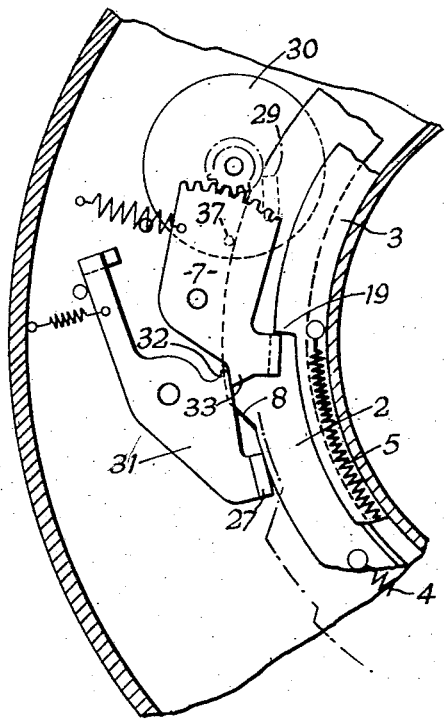
Figure 2 shows the shutter in its running down movement of the shutter, the shutter blades being open.
Figure 3:
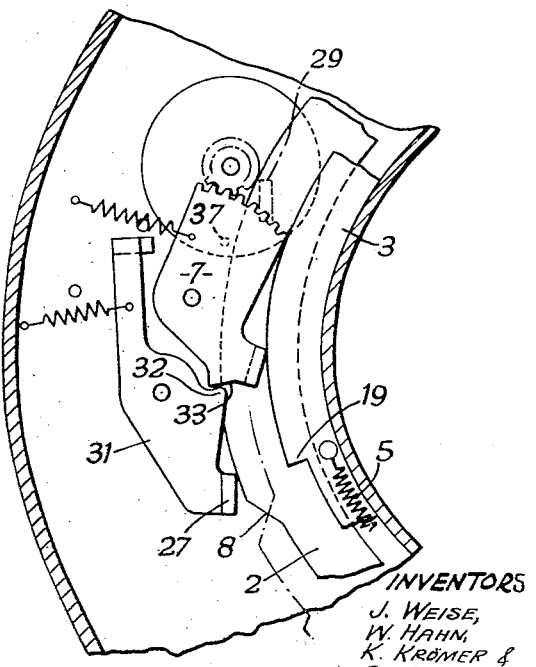
Figure 3 shows the shutter with its members in a position of rest after running down.

When the release lever 13 is actuated in a counterclockwise direction, the locking lever 14 releases the control ring 2, and consequently the spring 4 drives the control ring 2. If the pre-timer mechanism is engaged, a delaying of the running down of the control ring 2 first occurs, since the hook 10 is in engagement with the hook wheel 11, and drives the entire gear train (not shown) of the pre-timer mechanism. Only when the lug 23 provided on the hook 10 strikes upon the cam 12 and is pivoted thereby out of the hook wheel 11, does the actual operation of exposure commence. The control ring continues to run down and in so doing the control cam 8 pivots the pawl 6 out of the path of the blade drive ring 3, the control cam 8 engaging a pin 37 on the pawl 6, so that the blade driving ring 3 thereupon runs down under the action of its drive spring 5 and after travelling through half of its path is halted by the pawl 7 by means of the projection 19 (Figure 2). In the meantime, the control ring 2 has continued its travel and has run with its lug 24 against the retarding member 9 which now retards the running down of the control ring. After the control ring 2 has pressed the retarding member 9 out of its path, it strikes with its control cam 8 against a control lug 27 of a control lever 31 whereby the control lever 31 is rotated in a clockwise direction and its end projection 32 is pivoted out of the path of the nose 33 of the pawl 7. The locking pawl 7 is thereby released and the blade driving ring 3 can continue with its movement (Figure 3).

In order to obtain very short exposure times an exposure time setting member (not here illustrated) is provided with cams 25 and 26 which, on corresponding setting of the setting member, engage the control lever 31 by means of the control lug 27 and pivot it out of the path of the pawl 7 so that the blade driving ring is not first stopped in its open position (Figures 4 and 5). The pawl 7 is preferably constructed as a toothed segment and co-operates with the escapement disc 30. Thus, firstly the jerky stopping and sudden moving on of the blade driving ring 3 is avoided and also in the case of short exposure times, a most extensive constancy of the duration of exposure is guaranteed, since the pawl 7 acts with the escapement disc 30 as an escapement for the regulation of the duration of exposure.

If a picture is to be taken with short exposure time the control lever 31 (Figure 4) is pivoted by means of the curved part 26 so far in the clockwise direction that the pawl 7 driven during the exposure operation does not strike with the nose 33 against the end face 32. Thus it is made possible for the blade driving ring 3 driving the pawl 7 to permit the closing movement to follow the opening movements of the blades 28 immediately. During a short time while the blades 28 clear the shutter aperture the running down of the blade driving ring 3 is delayed solely by the relatively weak complementary escapement 7, 30. In the case of picture taking with an even shorter exposure time the exposure setting member (not shown) is rotated so far (Figure 5) that the curved part 25 comes to lie beneath the control lug 27. The control lever 31 here rotates still further in the clockwise direction and strikes with a push member 34 on the edge 35 of the pawl 7 which, as a result of the rotation of the control lever 31, is similarly rotated in the clockwise direction. The consequence of this operation is that the locking lug 36 of the pawl 7 is pivoted out of the path of the blade driving ring 3 and the running down blade driving ring 3 is neither interrupted nor delayed in its movement. The running down of the blade driving ring 3 taking place in this manner without interruption renders possible the obtaining of a very short time of exposure.

In order, in the case of picture-taking by flashlight, to do justice to the various types of flash lamps, a contact escapement of a known style of construction (not here illustrated) can be provided for this purpose. This contact escapement delays the control ring 2 and comes into action after the control ring is uncoupled from the pre-timer mechanism and delays the initiation of the exposure operation by the lifting out of the pawl 6 in relation to a contacting action. Since the contact escapement is arranged independently of the pre-timer mechanism, flash lamps can be used with or without delayed illumination if pictures are to be taken with or without pre-timing.

We claim:

1. A photographic objective shutter comprising a housing, a control ring rotatably mounted within the housing, said control ring being capable of being moved from a position of rest into a cocked position and reversely, a plurality of blades pivotally mounted on the housing and which open and close the aperture of the shutter on rotation of said blades in one direction, a blade driving ring rotatably mounted within the housing for movement from a position of rest to a cocked position and reversely, means for rotatably driving the control ring and blade driving ring respectively from their cocked positions towards their positions of rest, a cam on said control ring, first and second pawls pivotally mounted on the said housing, projecting means on said blade driving ring engageable with said first pawl and said second pawl, said first pawl being rockable by said cam, and control means, operable by said cam, for releasably holding said second pawl in the path of said projecting means, whereby the first pawl locks the blade driving ring in its cocked position and after the release of said driving ring on the rocking of said first pawl caused by the running down of the control ring, the second pawl stops the running down movement of the blade driving ring at a position where the blades completely open the aperture, thereafter on the release of said second pawl by the control means operated by the continued running down of said control ring, said blade driving ring continues running down to close the aperture.

2. A photographic objective shutter comprising a housing, a control ring rotatably mounted within the housing, said control ring being capable of being moved from a position of rest into a cocked position and reversely, a plurality of blades pivotally mounted on the housing and which open and close the aperture of the shutter on rotation of said blades in one direction, a blade driving ring rotatably mounted within the housing for movement from a position of rest to a cocked position and reversely, means for rotatably driving the control ring and blade driving ring respectively from their cocked positions towards their positions of rest, a cam on said control ring, first and second pawls pivotally mounted on the said housing, projecting means on said blade driving ring engageable with said first pawl and said second pawl, said first pawl being rockable by said cam, and control means, operable by said cam, for releasably holding said second pawl in the path of said projecting means, a first retarding means for retarding the movement of said second pawl, and a second retarding means for retarding the running down movement of the control ring; whereby the first pawl locks the blade driving ring in its cocked position and after the release of said driving ring on the rocking of said first pawl caused by the running down of the control ring, the second pawl stops the running down movement of the blade driving ring at a position where the blades completely open the aperture, thereafter on the release of said second pawl by the control means operated by the continued running down of said control ring, said blade driving ring continues running down to close the aperture.

3. A photographic objective shutter comprising a housing, a control ring rotatably mounted within the housing, said control ring being capable of being moved from a position of rest into a cocked position and reversely, a plurality of blades pivotally mounted on the housing and which open and close the aperture of the shutter on rotation of said blades in one direction, a blade driving ring rotatably mounted within the housing for movement from a position of rest to a cocked position and reversely, means for rotatably driving the control ring and blade driving ring respectively from their cocked positions towards their positions of rest, means provided on said control ring to effect simultaneous cocking of said blade driving ring with said control ring, a cam on said control ring, first and second pawls pivotally mounted on the said housing, projecting means on said blade driving ring engageable with said first pawl and said second pawl, said first pawl being rockable by said cam, and control means, operable by said cam, for releasably holding said second pawl in the path of said projecting means, whereby the first pawl locks the blade driving ring in its cocked position and after the release of said driving ring on the rocking of said first pawl caused by the running down of the control ring, the second pawl stops the running down movement of the blade driving ring at a position where the blades completely open the aperture, thereafter on the release of said second pawl by the control means operated by the continued running down of said control ring, said blade driving ring continues running down to close the aperture.

4. A photographic objective shutter comprising a housing, a control ring rotatably mounted within the housing, said control ring being capable of being moved from a position of rest into a cocked position and reversely, a plurality of blades pivotally mounted on the housing and which open and close the aperture of the shutter on rotation of said blades in one direction, a blade driving ring rotatably mounted within the housing for movement from a position of rest to a cocked position and reversely, means for rotatably driving the control ring and blade driving ring respectively from their cocked positions towards their positions of rest, means provided on said control ring to effect simultaneous cocking of said blade driving ring with said control ring, a cam on said control ring, first and second pawls pivotally mounted on the said housing, projecting means on said blade driving ring engageable with said first pawl and said second pawl, said first pawl being rockable by said cam, and control means, operable by said cam, for releasably holding said second pawl in the path of said projecting means, an escapement, a toothed segment provided on the second pawl in engagement with said escapement for retarding the movement of said second pawl, and further retarding means for retarding the running down movement of the control ring; whereby the first pawl locks the blade driving ring in its cocked position and after the release of said driving ring on the rocking of said first pawl caused by the running down of the control ring, the second pawl stops the running down movement of the blade driving ring at a position where the blades completely open the aperture, thereafter on the release of said second pawl by the control means operated by the continued running down of said control ring, said blade driving ring continues running down to close the aperture.

5. A photographic objective shutter comprising a housing, a control ring rotatably mounted within the housing, said control ring being capable of being moved from a position of rest into a cocked position and reversely, a plurality of blades pivotally mounted on the housing and which open and close the aperture of the shutter on rotation of said blades in one direction, a blade driving ring rotatably mounted within the housing for movement from a position of rest to a cocked position and reversely, means for rotatably driving the control ring and blade driving ring respectively from their cocked positions towards their positions of rest, a cam on said control ring, first and second pawls pivotally mounted on the said housing, projecting means on said blade driving ring engageable with said first pawl and said second pawl, said first pawl being rockable by said cam, control means operable by said cam, for releasably holding said second pawl in the path of said projecting means, setting means for holding the control means in a position so that the said second pawl becomes released and also that the control mans is moved out of the path of said cam, a first retarding means for retarding the movement of said second pawl, and a second retarding means for retarding the running down movement of the control ring; whereby the first pawl locks the blade driving ring in its cocked position and after the release of said driving ring on the rocking of said first pawl caused by the running down of the control ring, the second pawl retards the running down movement of the blade driving ring at a position where the blades completely open the aperture, thereafter on the completion of the retarded movement of said second pawl out of the path of said projecting means said blade driving ring continues running down to close the aperture.

6. A photographic objective shutter comprising a housing, a control ring rotatably mounted within the housing, said control ring being capable of being moved from a position of rest into a cocked position and reversely, a plurality of blades pivotally mounted on the housing and which open and close the aperture of the shutter on rotation of said blades in one direction, a blade driving ring rotatably mounted within the housing for movement from a position of rest to a cocked position and reversely, means for rotatably driving the control ring and blade driving ring respectively from their cocked positions towards their positions of rest, a cam on said control ring, first and second pawls pivotally mounted on the said housing, projecting means on said blade driving ring engageable with said first pawl and said second pawl, said first pawl being rockable by said cam, control means, operable by said cam, for releasably holding said second pawl in the path of said projecting means, and setting means for holding the control means in a position so that the said second pawl is moved out of the path of said projecting means, whereby the first pawl locks the blade driving ring in its cocked position and after the release of said driving ring on the rocking of said first pawl caused by the running down of the control ring, the blade driving ring runs off uninterrupted by said second pawl to effect opening and closing of the aperture.

7. A photographic objective shutter comprising a housing, a control ring rotatably mounted within the housing, said control ring being capable of being moved from a position of rest into a cocked position and reversely, a plurality of blades pivotally mounted on the housing and which open and close the aperture of the shutter on rotation of said blades in one direction, a blade driving ring rotatably mounted within the housing for movement from a position of rest to a cocked position and reversely, means for rotatably driving the control ring and blade driving ring respectively from their cocked positions towards their positions of rest, a cam on said control ring, first and second pawls pivotally mounted on the said housing, projecting means on said blade driving ring engageable with said first pawl and said second pawl, said first pawl being rockable by said cam, control means, operable by said cam, for releasably holding said second pawl in the path of said projecting means, and setting means for holding the control means in a position so that the said second pawl is moved out of the path of said projecting means, a first retarding means for retarding the movement of said second pawl, and a second retarding means for retarding the running down movement of the control ring; whereby the first pawl locks the blade driving ring in its cocked position and after the release of said driving ring on the rocking of said first pawl caused by the running down of the control ring, the blade driving ring runs off uninterrupted by said second pawl to effect opening and closing of the aperture.

8. A photographic objective shutter comprising a housing, a control ring rotatably mounted within the housing, said control ring being capable of being moved from a position of rest into a cocked position and reversely, a plurality of blades pivotally mounted on the housing and which open and close the aperture of the shutter on rotation of said blades in one direction, a blade driving ring rotatably mounted within the housing for movement from a position of rest to a cocked position and reversely, means for rotatably driving the control ring and blade driving ring respectively from their cocked positions towards their positions of rest, means provided on said control ring to effect simultaneous cocking of said blade driving ring with said control ring, a cam on said control ring, first and second pawls pivotally mounted on the said housing, projecting means on said blade driving ring engageable with said first pawl and said second pawl, said first pawl being rockable by said cam, control means, operable by said cam, for releasably holding said second pawl in the path of said projecting means and setting means for holding the control means in a position so that the said second pawl is moved out of the path of said projecting means, a first retarding means for retarding the movement of said second pawl, and a second retarding means for retarding the running down movement of the control ring; whereby the first pawl locks the blade driving ring in its cocked position and after the release of said driving ring on the rocking of said first pawl caused by the running down of the control ring, the blade driving ring runs off uninterrupted by said second pawl to effect opening and closing of the aperture.

9. A photographic objective shutter comprising a housing, a control ring rotatably mounted within the housing, said control ring being capable of being moved from a position of rest into a cocked position and reversely, a plurality of blades pivotally mounted on the housing and which open and close the aperture of the shutter on rotation of said blades in one direction, a blade driving ring rotatably mounted within the housing for movement from a position of rest to a cocked position and reversely, means for rotatably driving the control ring and blade driving ring respectively from their cocked positions towards their positions of rest, means provided on said control ring to effect simultaneous cocking of said blade driving ring with said control ring, a cam on said control ring, first and second pawls pivotally mounted on the said housing, projecting means on said blade driving ring engageable with said first pawl and said second pawl, said first pawl being rockable by said cam, control means, operable by said cam, for releasably holding said second pawl in the path of said projecting means, setting means for holding the control means in a position so that the said second pawl becomes released and also that the control means is moved out of the path of said cam, a first retarding means for retarding the movement of said second pawl, and a second retarding means for retarding the running down movement of the control ring; whereby the first pawl locks the blade driving ring in its cocked position and after the release of said driving ring on the rocking of said first pawl caused by the running down of the control ring, the second pawl retards the running down movement of the blade driving ring at a position where the blades completely open the aperture, thereafter on the completion of the retarded movement of the said second pawl out of the path of said projecting means, said blade driving ring continues running down to close the aperture.

References Cited in the file of this patent

UNITED STATES PATENTS

| | | |
|---|---|---|
| 1,687,123 | Deckel | Oct. 9, 1928 |
| 1,953,556 | Gitzhoven | Apr. 3, 1934 |
| 2,350,106 | Fuerst | May 30, 1944 |
| 2,382,623 | Fuerst | Aug. 14, 1945 |